United States Patent [19]

Allen

[11] 4,036,383

[45] July 19, 1977

[54] FORK LIFT TRUCK TOTE BOX DUMPER

[76] Inventor: Curtiss B. Allen, 190 Terracina, Redlands, Calif. 92373

[21] Appl. No.: 668,578

[22] Filed: Mar. 19, 1976

[51] Int. Cl.[2] .............................................. B65G 65/04

[52] U.S. Cl. .................................................... 214/313

[58] Field of Search ............... 214/312, 313, 314, 315, 214/316, 317, 620, 750, 701 P, 701 Q

[56] References Cited

U.S. PATENT DOCUMENTS

| | | | |
|---|---|---|---|
| 2,478,462 | 8/1949 | Decker | 214/704 |
| 3,307,724 | 3/1967 | Miller | 214/313 |
| 3,595,414 | 7/1971 | Brown et al. | 214/313 |
| 3,850,322 | 11/1974 | Miles et al. | 214/620 |
| 3,971,485 | 7/1976 | Hoppey | 214/313 |

FOREIGN PATENT DOCUMENTS

| | | | |
|---|---|---|---|
| 1,283,701 | 8/1972 | United Kingdom | 214/313 |

*Primary Examiner*—Lawrence J. Oresky

*Attorney, Agent, or Firm*—Dana E. Keech

[57] ABSTRACT

A flat structural steel frame impalable on the two pronged fork of a fork lift truck and thereafter insertable by the manipulation of said truck within horizontal openings provided in the bottom of a tote box whereby said box may be lifted by said truck, an advanced portion of said frame on which said box rests being rockably mounted on the balance of said frame and being power rotatable forwardly, to invert the box to dump the contents therefrom, and then reversely to restore the box to its upright position.

6 Claims, 6 Drawing Figures

FORK LIFT TRUCK TOTE BOX DUMPER

SUMMARY OF THE INVENTION

Tote boxes are widely provided with horizontal fork prong receiving openings in their bottoms to permit their being handled economically by fork lift trucks.

Inasmuch as most of the bulk products handled in tote boxes may be gravity dumped therefrom various box dumping machines have been provided for performing this function.

It is a principal object of the present invention to provide an accessory device which may be quickly associated or disassociated with a fork lift truck and which enables the truck operator, after picking up a loaded tote box on his truck, to transport it forthwith to any desired destination and lift it to any height within the lifting range of the truck and then power rock the box to invert the same and dump the contents therefrom and then reversely power rotate the box to its upright position while the truck is being driven to the place for depositing the empty box.

Another object of the invention is to provide such a device which is electric powered from the truck battery and switch controlled from the operator's seat.

Yet another object of the invention is to provide a combination novel tote box and fork lift truck accessory device in which the tote box will have steel flanges flush with both front and rear ends of said bottom openings and the accessory box inverting cradle will have hooks engaging the forwardmost of said flanges to retain control of said box by the truck operator during the forward inversion of the box.

A further object of the invention is to provide such an accessory device in which the box inverting cradle has a box engaging back stop and an overhanging box retaining element, the latter being adjustable to accommodate boxes varying in height.

Still another object is to provide such an accessory device having a positive stop cable means for limiting the maximum inverted dumping position of the tote box, and a spring loaded means for returning the cradle and box to upright position upon the relaxing of the power dumping mechanism.

A further object is to provide such an accessory device having latch means manually actuatable for retaining the device assembled on a fork lift truck.

DETAILED DESCRIPTION OF THE PREFERRED EMBODIMENT

Figure 1:
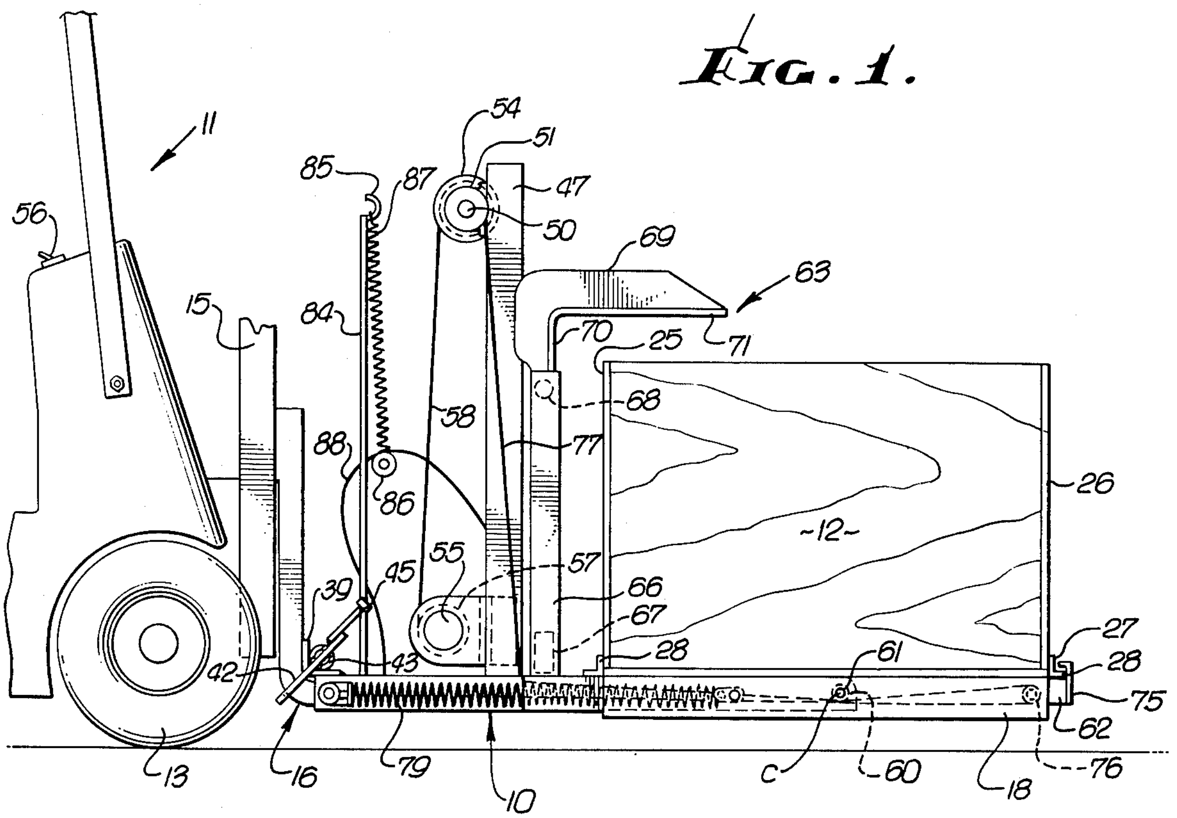
FIG. 1 is a diagrammatic side elevation of a preferred embodiment of the tote box dumping accessory device of the invention with the flat horizontal frame thereof impaled upon the prongs of a fork lift truck and with said truck actuated to extend said accessory frame into horizontal openings provided in the bottom of a tote box.
Figure 2:
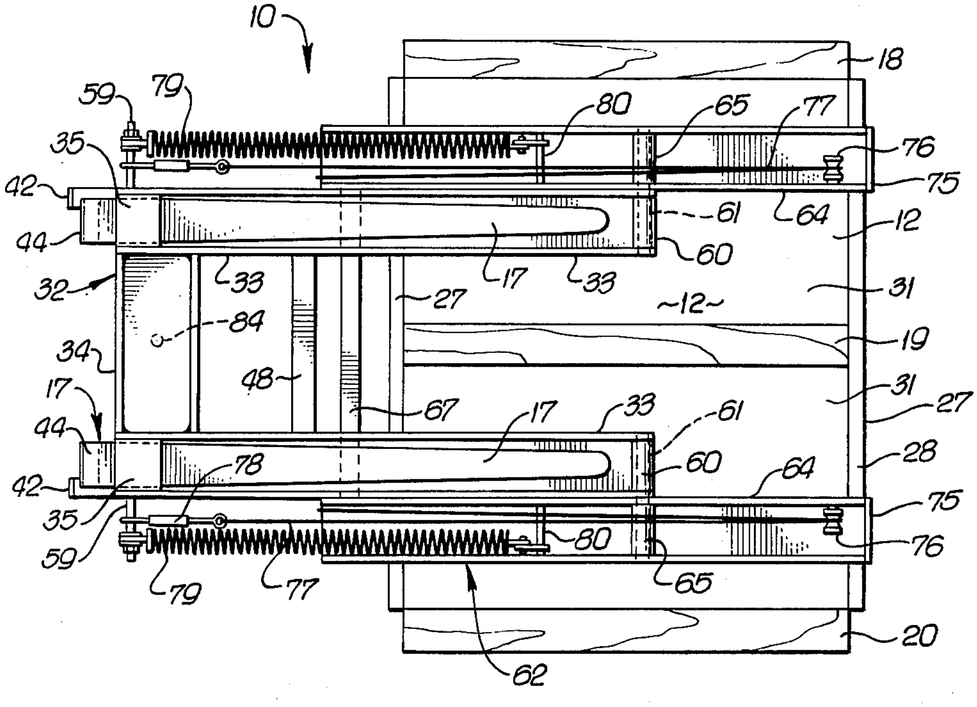
FIG. 2 is a bottom plan view of FIG. 1.
Figure 3:
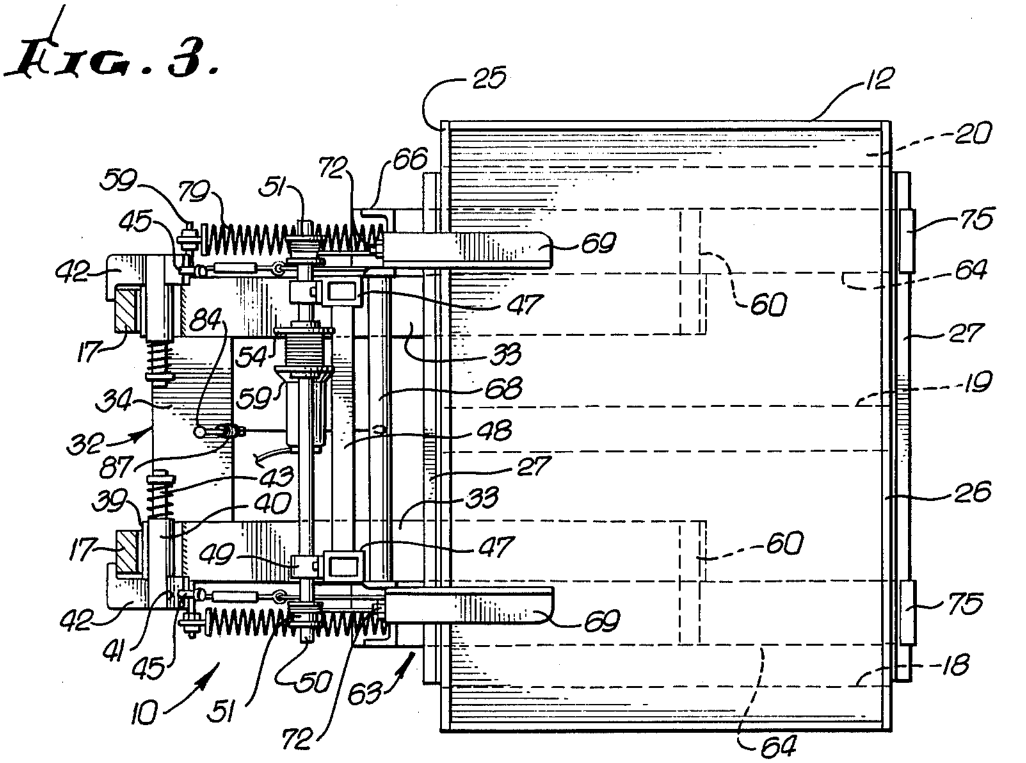
FIG. 3 is a top plan view of FIG. 1.

The invention comprises an accessory device 10 designed particularly for facilitating the employment of a powered fork lift truck 11 for lifting a tote box 12 from the ground to any elevation within the lifting range of the truck, power dumping the contents of the box by inverting the latter, restoring the box to upright position and depositing it wherever desired.

The truck 11 preferably travels on rubber tired wheels 13, certain of which are steerable and certain of which are power driven either by a battery powered electric motor or a gasoline engine, the ignition system of which embraces a twelve volt storage battery 14 and a recharging generator (not shown). The reason for these specific features in the truck 11 being especially desireable when associating accessory 10 with said truck will be made clear later.

The truck 11 is also provided with a telescopic elevator 15 for lifting a fork 16 comprising a pair of parallel approximately horizontal flat prongs 17. The truck 11 also embodies a power transmission mechanism enabling the operator to tilt the elevator 15 forward or backward a few degrees from vertical, at will.

While the invention is adaptable to be used in dumping the contents from many different styles of tote boxes concurrently in general use, the particular tote box 12 disclosed is especially designed for efficient handling in the accessory device 10. This box is preferably 48" wide, 36" from back to front, 25 deep and has three 3½ × 2¾ wooden cleats 18, 19 and 20 running from back to front just inside its ends and at its middle. The box walls and bottom are formed of ¾ plywood and lower edge portions of back and front walls 25 and 26 are reinforced by metal angles 27 so that one flange 28 of each of these angles has its bottom face flush with the bottom face of the box with said flanges extending horizontally backward and forward from the box while the other flanges are screwed to the box.

Horizontal openings 31 are formed in the bottom of box 12 between the end and center cleats, said openings extending completely through the box from back to front, and being provided to be penetrated by the accessory device 10 in preparing to dump the contents from said box.

The device 10 includes a flat structural steel frame 32 comprising a pair of co-planar parallel downturned metal channels 33 preferably 4¾ × 2¼ and 3' 7½ long which are united at their rear ends by being welded to opposite ends of a downturned metal channel section 34 measuring 6 × 2¼ and 14 long.

The bottom openings of channels 33 at their rear ends are closed by 3¾ × 4 plates 35 fitting between and welded to lower edges of the flanges of said channels. Closed slots 36 are thus formed in the rear end of frame 32 which are properly spaced to slideably receive respectively the prongs 17 of fork 16 when impaling said frame on said fork.

Welded on top of the rear corners of frame 32 right above slots 36 are 1¾ metal angles 39 which overhang the rear ends of channels 33 by about ½ and have tubular bearings 40 welded thereon. Outer ends of bearings 40 have notches 41 for allowing axial spring biased movement inwardly of latch plates 42 mounted on rods 43 rotatably slideable in said bearings whereby said latch plates 42 hook over the rear elbows 44 of said fork prongs 17 thereby preventing accidental withdrawal of said prongs from frame 32. Handles 45 are provided on latch plates 42 for manipulating the latter into operative or inoperative positions and expansion springs 46 coiled about inner ends of the rods 43 constantly bias rods 43 axially inwardly.

Welded at their lower ends to and resting perpendicularly on top of frame channels 33 are a pair of rectangular tubular metal masts 47 which are united at their lower ends by a channel cross beam 48 (2 × 7 × 19) interposed therebetween and welded thereto. The masts 47 are preferably about 40 in height but can be shorter where this interfaces with overhead clearance in certain truck operational environments.

Mounted to extend rearwardly from upper portions of masts 47 are aligned bearings 49 in which a jack shaft 50 journals. Fixed on said shaft just outside of bearings 49 are driven cable winding drums 51. Just inside one of said bearings, shaft 50 has fixed thereto a drive cable winding drum 54.

Mounted on the rear face of cross beam 48 is a twelve volt electric reversible winch 55 controlled by a switch 56 and having a cable power winding drum 57 which is in vertical radial alignment with drum 54, and is connected therewith by a drive cable 58.

Extending co-axially laterally from points near the rear ends of frame channels 33 are a pair of studs 59. At their front ends said channels have tubular bearings 60 welded in place so as to be open at their laterally outward ends to slidably receive ¾ diameter pivot pins 61 which extend 4½ laterally from said open bearing ends.

Assembled on pins 61 in a co-planar pivotal relation with frame 32 is a flat base 62 of a box cradle 63. Said base comprises a pair of downwardly facing metal channels 64 placed parallel and in outward contact with channels 33 and having welded thereto tubular bearings 65 in which lateral portions of pins 61 journal.

The base 62 is thus normally in horizontal co-planar relation with frame 32 although mounted thereon for free pivotal rotation about the axis C of pins 61 which are located at the front end of frame 32 and 19 from the front end of cradle base 62 and 25½ from the rear end of said base.

Resting on and welded to rear end portions of cradle base channels 64 is a vertical pair of box back stop posts comprising rearward facing metal channels 66 which are joined by a transverse 2 × 4 metal tube 67 with its ends abutting channels 66 and welded thereto just above cradle base channels 64. Upper ends of vertical channels 66 are likewise spaced and connected by a round pipe 68 welded at its ends thereto.

Cradle 63 also includes upper box engaging members 69 formed of angle iron and having vertical and horizontal elements 70 and 71, the first of which are slotted and adjustably secured by bolts 72 to metal channels 66, and the latter of which elements extend forwardly over the back wall 25 of a tote box 12 resting on the cradle base 62.

Front ends of cradle base channels 64 have pieces of angle iron welded thereto to form upwardly and rearwardly extending hooks 75 which hook over the foremost of the box flanges 28 to capture box 12 and positively prevent its accidental release from cradle 63 during a box dumping operations. Just inwardly from their front ends, said channels 64 have pulleys 76 mounted and on each side of the device 10 a quarter inch steel wire woven cable 77 has one end connected by a turnbuckle 78 to the stud 59 on that side of the device 10, said cable then extending through channel 64 on that side and around the pulley 76 of that channel and then returning rearwardly through said channel and turning upwardly from the rear end of said channel. The cable passes directly to a firm connection with the driven drum 51 on that side and on which drum all the slack in said cable is wound.

The device 10 employs a pair of powerful 2 diameter coil springs 79 for spring biasing box cradle 63 to provide the power for restoring said cradle and the box 11, captured therein, to upright positions immediately following a box dumping operation. The rear end of each spring 79 is anchored on one of the studs 59 and the front end of that spring is anchored on a lug 80 located in the adjacent channel 64 a suitable distance rearwardly from pivotal axis C of cradle 63.

Welded at its lower end to and extending vertically from metal channel section 34, is a half inch pipe mast 84 surmounted with a hook 85 from which a pulley 86 is suspended on a small diameter coil spring 87. One end of a tether cable 88 which passes through pulley 86 is anchored at 89 on channel section 34, while the other end of said tether cable is anchored at 90 on cradle 63.

OPERATION

The accessory device 10 of the present invention is normally stored, whether or not it is associated with a fork lift truck 11, with its steel frame channels 33 and its cradle base channels 64 in a co-planar relation, resting flat on the floor.

The rearwardly eccentric center of gravity of the box cradle 63, at this time, joins with the anti-clockwise bias applied by springs 79 to said cradle and the fact that channels 33 and 64 are jointly resting in coplanar relation on the floor, to hold the frame 32 and cradle 63 thus assembled together.

The electric switch 56 by which the reversible electric winch 55 is controlled is mounted on the fork lift truck 11 at a location conveniently reachable by the truck operator from his seat on the truck and is connected by an unplugable service cord to said winch. This cord is unplugged excepting when the device 10 is impaled upon the truck fork prongs as shown in the drawings.

Assuming the device 10 to be unencumbered by a tote box 12 and stored and separated from truck 11, the aforementioned impaling of the device on the truck is preceded by pulling handles 45 outwardly to withdraw latch plates 42 from notches 41 and rocking said plates into vertical positions where they rest on outer ends of bearings 40 out of the way of elbows 44 when the impaling takes place. The latter step is then accomplished by aligning the truck with the rear of the device, and with the fork prongs 17 lifted a half inch from the floor, advancing the truck under power to cause the prongs to penetrate the open slots 36 in the rear end of frame 32.

The latch plate handles 45 are now swung 45° forwardly into alignment with notches 41 causing springs 46 to pull the plates 42 into said notches in which positions said latches extend behind prong elbows 44 thereby latching the device 10 in impaled relation with prongs 17.

The assembled truck 11 and accessory device 10 are now ready to be operated by lifting the elevator 15 to raise the device 10 to any desired level within the lifting range of said elevator and to travel with the truck to any point where there is a loaded tote box 12 which the operator desires to dump. Whatever level the tote box is supported at, the operator is able to place the device 10 at a corresponding level and approach the box 12 with the flat horizontal channels 33 and the channels 64 pivotally connected thereto by pins 61 aligned horizontally with the bottom fore and aft openings 31 of the tote box 12. The channels 33 and 64 thus freely penetrate box openings 31 until the hooks 75 extend forwardly of the front flange 28 of the box, whereupon the operator halts forward movement of the truck 11 and lifts on the elevator, thus supporting the box on cradle base 62 with hooks 75 positioned to overlie and capture the front flange 28 of the box when the cradle 63 is rocked forwardly to dump the box's contents therefrom.

Figure 4:
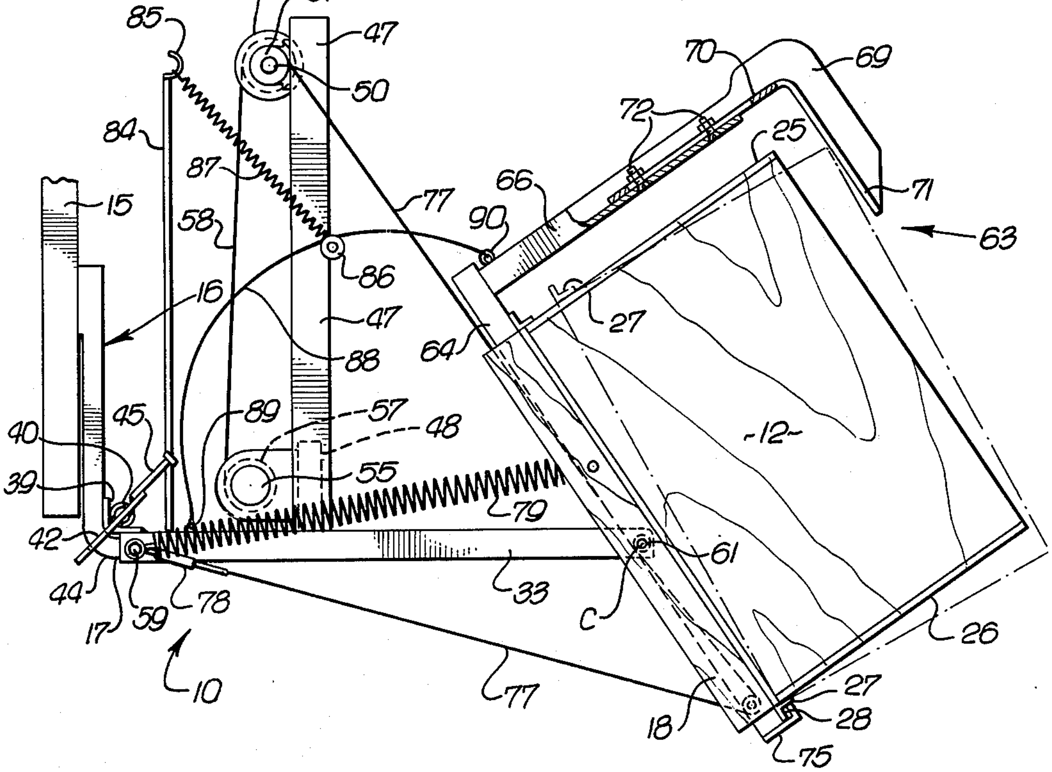
FIG. 4 is a view similar to FIG. 1 showing an initial phase of the inverting of said box.
Figure 5:
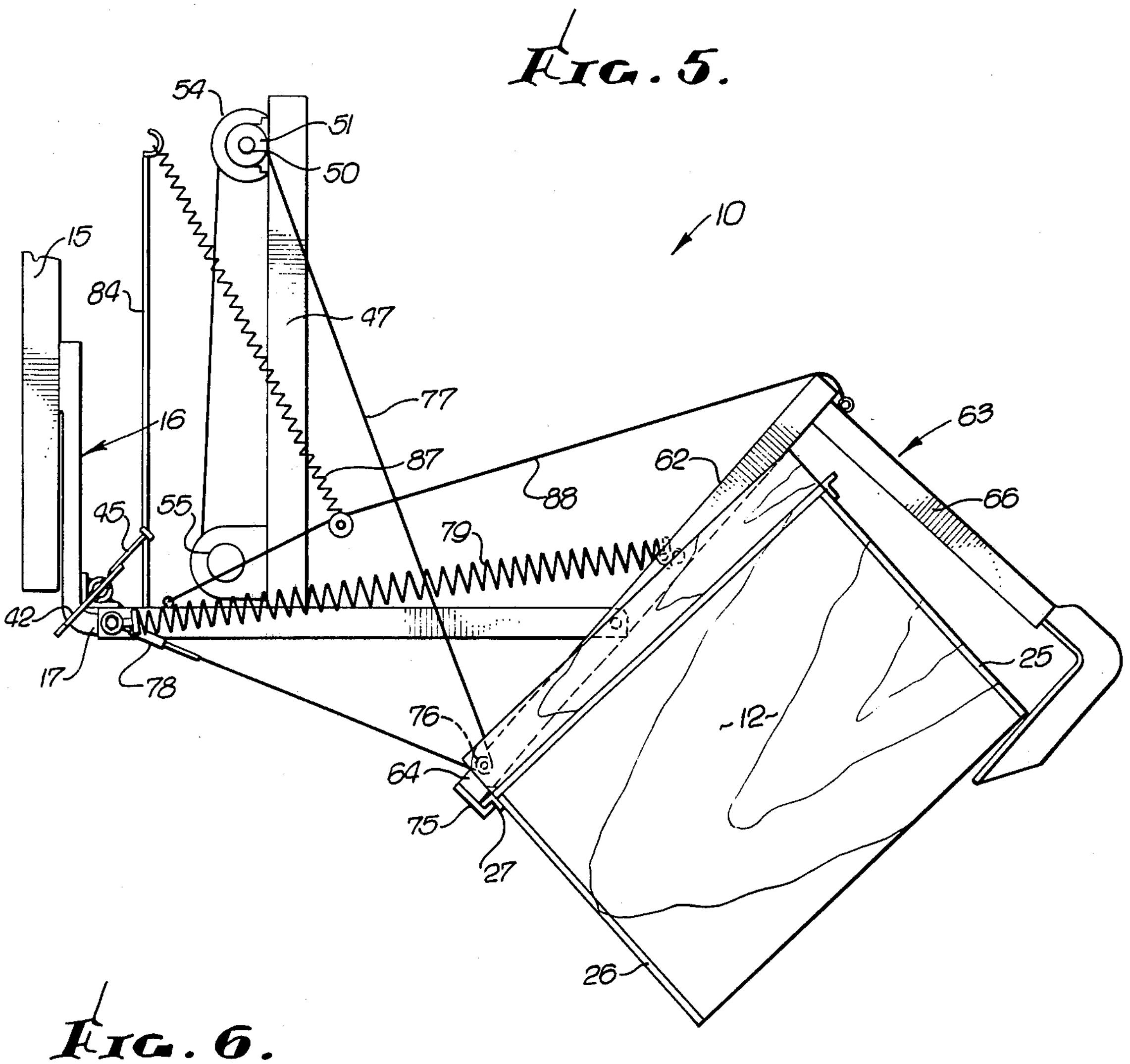
FIG. 5 is a view similar to FIG. 4 showing said box in its position of maximum inversion.
Figure 6:
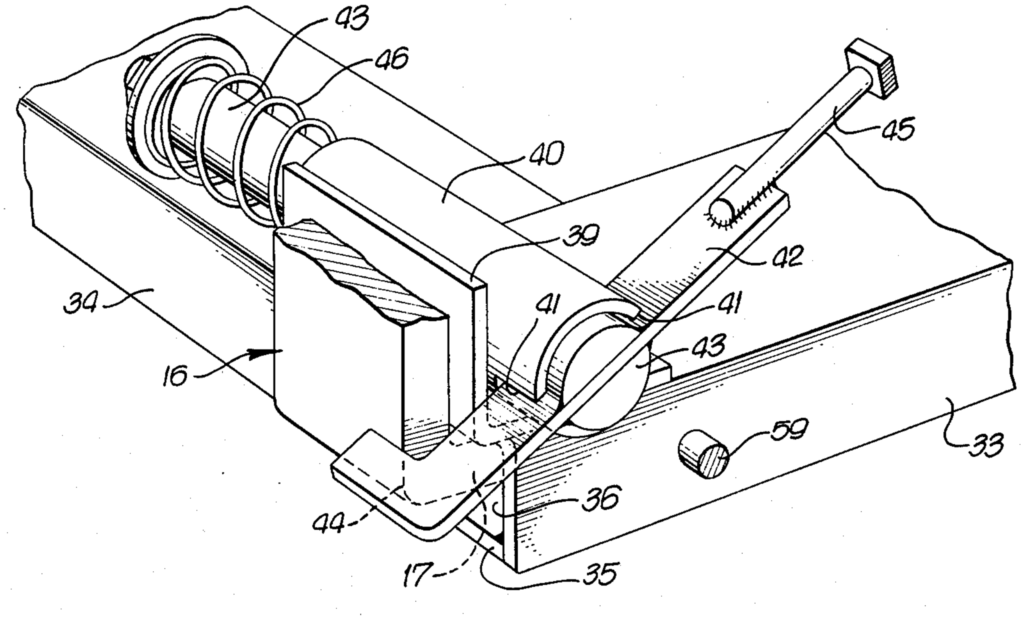
FIG. 6 is an enlarged perspective detail of one of the pair of latches for holding the accessory device in impaled relation with the lift truck fork.

The operator having proceeded with the loaded tote box supported in level position on the box cradle 63 to the place where the contents of the box are to be dumped, he closes switch 56 to energize the electric winch 55 in a direction to wind cable 58 onto the winch's winding drum 57 thus unwinding the opposite end of said cable from driving cable winding drum 54 and thereby rotating jack shaft 50 (as seen in FIG. 1) in a counter clockwise direction. This starts winding up cables 77 on driven cable drums 51 which rotates box cradle 63 as shown in FIGS. 4 and 5 to completely dump the loose products therefrom.

The box cradle 63 is constantly spring biased by springs 79 into its upright position and, when the truck operator reverses the direction of rotation of winch 55 through manipulation of switch 56, the cables 77 are paid out from driven cable drums 51, permitting springs 79 to return cradle 63 and the empty tote box 12 captured therein to their upright positions shown in FIG. 1.

When it is desired to set box 12 down, either while filled or empty, the box is allowed to come to rest on the floor, after which the device 10 is propelled forwardly enough to disengage the hooks 75 from the front box flange 28. The elevator 15 is then lowered to allow the box cradle 63 to rest on the floor and the truck 11 is placed in reverse to withdraw the device 10 from openings 31 of the box 12.

To detach the truck 11 from the box dumping accessory 10, the latter is deposited by the operator wherever it is desired to store the accessory, after which the latches 42 are swung into their vertical positions free of the truck prong elbows 44, the plug for the circuit energizing electric winch 55 is disconnected, and the truck is then maneuvered to withdraw its prongs from the accessory.

What is claimed is:

1. The combination of:

frame means impalable horizontally upon the prongs of a fork pick-up truck and insertable, when supported as so impaled upon said prongs, into suitable horizontal openings provided therefor in the bottom of a tote box;

a box cradle pivotally mounted on a low transverse axis on the forward end of said frame means and extending therebeyond, said cradle including a flat cradle base which is normally in co-planar relation with said frame means when the latter is inserted into said horizontal box openings whereby said cradle base is also inserted into said box openings so as to underlie said box;

means on said cradle preventing said box falling from said cradle when the latter is rotated to invert said box;

means mounted on said frame means and controlled from the driver's seat of said fork lift truck for power rotating said cradle to first dump the contents from said box, while retaining said box confined within said cradle, and then reversibly rotating said cradle thereby returning said cradle base to its co-planar relation with said frame means permitting said box to be set down right side up on the ground and said frame means and cradle base withdrawn from the bottom openings in said box, by manipulating said fork lift truck with said frame means impaled thereon, said cradle including a rear box limit stop fixed on said cradle base and an upper box limit stop fixed on said rear box limit stop, which stops join with said cradle base to provide fixed barriers limiting movement of said box with reference to said cradle in any of three directions dispersed at intervals of ninety degrees readily about said transverse axis;

said box being an element of said combination and including horizontally forwardly extending flange means along the front lower edge thereof just above said horizontal box openings herein; and a forward box limit stop means on the front edge of said cradle base and extending upwardly therefrom to be interposed in front of said box when said frame means and cradle base have been fully inserted into said box bottom openings and then lifted into supporting relation with said box, said forward box limit stop means being shaped to interlock with said flange means thereby securely retaining said box in said cradle while the contents are being dumped therefrom.

2. The combination of:

frame means impalable horizontally upon the prongs of a fork pick up truck and insertable, when supported as so impaled upon said prongs, into suitable horizontal openings provided therefor in the bottom of a tote box;

a box cradle pivotally mounted on a low transverse axis on the forward end of said frame means and extending therebeyond, said cradle including a flat cradle base which is normally in co-planar relation with said frame means when the latter is inserted into said horizontal box openings whereby said cradle base is also inserted into said box openings so as to underlie said box;

means on said cradle preventing said box falling from said cradle when the latter is rotated to invert said box;

means mounted on said frame means and controlled from the driver's seat of said fork lift truck for power rotating said cradle to first dump the contents from said box, while retaining said box confined within said cradle, and then reversibly rotating said cradle thereby returning said cradle base to its co-planar relation with said frame means permitting said box to be set down right side up on the ground and said frame means and cradle base withdrawn from the bottom openings in said box, by manipulating said fork lift truck with said frame means impaled thereon, said frame means comprising a pair of parallel downwardly facing horizontal co-planar metal channels spaced properly apart to slidingly receive the fork prongs of said truck when aligned with the open rear ends of said channels, said channel rear end portions having bottom plate means preventing forward rotation of said channels on said prongs by the weight of a loaded box, said cradle base comprising a pair of parallel downwardly facing metal channels horizontally co-planar with said frame channels and located closely outside of and alongside said frame channels, said axis on which said frame means and said cradle base are pivotally connected lying slightly forward of the center of gravity of said cradle base but a substantial distance to the rear of the front end of said cradle base, said means on said cradle preventing the box falling therefrom when the cradle is rotated about said axis comprising:

a back stop overlying and rigidly uniting rear end portions of said cradle base channels and rising therefrom approximately to the height of said box;

an upper stop mounted on said back stop and overlying a rear portion of said box; and a forward lower stop means mounted on the front ends of said cradle base channels, said means extending upwardly to overlie the front lower portion of said box when said box is lifted by said cradle preliminary to dumping the contents therefrom.

3. A combination as recited in claim 2 wherein said means for reversely power rotating said cradle comprises:

a dual mast transversely spanning and welded to said frame channels just aft of said cradle;

an electric winch mounted low on said mast;

a jack shaft journalled in bearings spaced and aligned transversely high on said dual mast;

a pair of driven drums fixed on the ends of said jack shaft and radially aligned with said cradle base channels;

a drive drum on said jack shaft radially aligned with said winch;

a drive cable opposite end portions of which are wound on said drive drum and said winch for the purpose of electric power rotating said shaft;

driven cable means wound on said driven drums and applying power to said cradle to rock the same forwardly about the cradle axis to dump the contents from a tote box resting therein.

4. A combination as recited in claim 8 wherein means are provided for spring biasing said cradle reversely to return said cradle and box to upright position upon said power winch being reversed.

5. A combination as recited in claim 4 wherein said cradle is provided with a pair of pulleys mounted within the forward ends of said cradle base channels, and wherein said driven cable means includes said pulleys and a pair of driven cables wound respectively at one end on said driven drums, said driven cables then passing under said cradle base channels, around said pulleys and then reversely under said channels, the opposite ends of said driven cables terminating in means connecting the same to rearward portions of said frame channels.

6. A combination as recited in claim 5 wherein said cable connecting means include studs transversely extending from said frame channels near their rear ends; and turnbuckles connecting said cables to said studs, and wherein said cradle spring biasing means comprises a pair of heavy coil springs, rear ends of which connect to said studs and forward ends of which are fastened to said cradle base channels at points spaced rearwardly from the cradle dumping axis, and said springs being normally tensioned even when said cradle is upright.

* * * * *

UNITED STATES PATENT OFFICE

CERTIFICATE OF CORRECTION

Patent No. 4,036,383 Dated July 19, 1977

Inventor(s) Curtiss B. Allen

It is certified that error appears in the above-identified patent and that said Letters Patent are hereby corrected as shown below:

Column 6, line 16, "readily" should read -- radially --.

Signed and Sealed this

*Twenty-fifth* Day of *October 1977*

[SEAL]

*Attest:*

RUTH C. MASON
*Attesting Officer*

LUTRELLE F. PARKER
*Acting Commissioner of Patents and Trademarks*